United States Patent [19]

Shannon

[11] Patent Number: 4,931,787
[45] Date of Patent: Jun. 5, 1990

[54] ACTIVE MATRIX ADDRESSED DISPLAY SYSTEM

[75] Inventor: John M. Shannon, Whyteleafe, England

[73] Assignee: U.S. Philips Corporation, New York, N.Y.

[21] Appl. No.: 197,553

[22] Filed: May 23, 1988

[30] Foreign Application Priority Data

May 29, 1987 [GB] United Kingdom ............... 8712648

[51] Int. Cl.⁵ .............................................. G09G 3/36
[52] U.S. Cl. .................................... 340/784; 340/718; 340/719; 350/332
[58] Field of Search ............... 340/784, 765, 718, 719; 350/332, 333, 336, 334

[56] References Cited

U.S. PATENT DOCUMENTS

4,775,861 10/1988 Saito ..................................... 340/784
4,781,438 11/1988 Noguchi .............................. 340/784

*Primary Examiner*—David K. Moore
*Assistant Examiner*—Jeffery A. Brier
*Attorney, Agent, or Firm*—Michael E. Marion

[57] ABSTRACT

A matrix display system includes an active matrix display device (10), for example a liquid crystal device, having a column and row array of picture elements (12) defined by opposing electrodes (16,17) with associated switching elements (11), such as thin film transistors, which are selectively operable by switching signals supplied via row conductors (14) to apply data signals supplied via column conductors (15) to the picture elements. The picture elements (12) are arranged in groups of at least two with the picture elements of each group being addressed via one row conductor (14) and one column conductor (15) and their associated switching elements (11) being operable at respective different levels of the switching signal for selective control. In this way, the number of address conductors (14,15) required can be reduced, allowing for example higher picture element densities. The picture elements of each group may be from the same row or adjacent rows. For a full color display, each group may comprise three picture elements each displaying a respective primary color.

25 Claims, 3 Drawing Sheets

ACTIVE MATRIX ADDRESSED DISPLAY SYSTEM

BACKGROUND OF THE INVENTION

This invention relates to a matrix display system comprising an active matrix display device having an array of picture elements arranged in rows and columns and defined by opposing electrodes with an electro-optical display medium disposed therebetween, switching elements associated with the picture elements and selectively operable by switching signals to apply data signals to the picture element electrodes, and switching signal and data signal conductors for supplying the switching signals and data signals respectively to each switching element.

A matrix display system of this kind is suitable for displaying alpha-numeric or video (for example, TV) information using passive electro-optical display material such as liquid crystal material, electrophoretic suspensions and electrochromic materials. Such active matrix addressed display systems may typically consist of a matrix array of a very large number, for example around 200,000 or more, picture elements.

In a known example of such a matrix display system in which the electro-optical medium comprises liquid crystal material, each picture element is defined by a respective electrode carried on one of two opposing transparent substrates and a facing portion of an electrode common to all picture elements carried on the other substrate. The switching elements comprise thin film transistors (TFTs) and are arranged laterally of their respective picture element electrodes on the one substrate in an array of row and columns extending between the picture element electrodes with the drain of each TFT being connected to its associated picture element electrode. The sources of all TFTs associated with one column of picture elements are connected to a respective one of a set of parallel column (data signal) conductors and the gates of all TFTs associated with one row of picture elements are connected to a respective one of a set of parallel row (scanning signal) conductors extending at right angles to the set of column conductors. The device is driven by repetitively scanning the row conductors in sequential fashion with a switching signal so as to turn "on" all TFTs in each row in turn and applying data signals to the column conductors as appropriate for each row in turn to build up a display picture. When turned "on", the TFTs form conductive paths between the column electrodes and the picture element electrodes of the row concerned which thus charge up to the applied column (data) voltage. When the switching signal disappears at the termination of energisation of the row, the TFTs are turned "off", thus isolating the picture element electrodes of the row so that charge is stored on each picture element. The picture elements stay in the state in to which they were driven, as determined by the applied column voltages, and modulate light transmission therethrough accordingly until the next time the TFT are addressed, this usually being in the subsequent field period. In the case, for example, of a TV display, the column (data) voltages are obtained by sampling the corresponding TV line signal at a number of regular intervals according to the number of picture elements in a row and appropriately placing the derived voltages on the column conductors.

In order to obtain a full colour display, a colour filter mosaic of red, green and blue filter elements is carried on the other substrate to colour light transmitted by the picture elements. The elements of the filters are registered with the picture elements so that each picture element is dedicated to one of the three primary colours. Groups of juxtaposed red, green and blue picture elements constitute colour triplets whose primary colour outputs combine to provide a multi-colour display capability. By driving the array of picture elements with the appropriate red, green and blue data signals, a full colour picture is produced.

It will be appreciated that with the above-described display system the minimum number of rows and column conductors necessary corresponds to the number of rows and columns respectively of picture elements. In addition to the need to devote a proportion of the area of the display device to the accommodation of the row and column conductors, there is also a possiblity that in view of the large number of conductors involved one or more could prove defective, perhaps rendering the device unusable. Problems are commonly encountered in this respect at the cross-overs of row and column conductors. Obviously, the more conductors employed, the greater this possibility becomes so that with comparatively large area display devices yields can be seriously effected.

Furthermore, the large numbers of row and column conductors necessary can also cause problems with the production of small area display devices. Large size displays can be obtained from small area display devices by using a projection system in which the image produced by the small area display device is projected onto a larger area screen. Such a system overcomes the difficulties involved in producing a large area display device. However, in order to provide the desired display resolution after projection, the display device generating the image should have adequate numbers of rows and columns of picture elements. Ideally a small area display device having a very compact array of picture elements is required to provide sufficient picture element density. However, the provision of a compact array of picture elements is complicated by the fact that a proportion of the area of the device is occupied by the row and column conductors and fabrication of a suitable display device becomes difficult because the high density of conductors necessary restricts obtainable picture element density.

SUMMARY OF THE INVENTION

It is an object of the present invention to provide an active matrix addressed display system in which either fewer address conductors need be provided or in which duplicated address conductors for redundancy purposes can be more readily accommodated.

It is another object of the present invention to provide an active matrix addressed display system which can, if desired, be fabricated either with a compact array of picture elements, thus rendering it suited to use in a projection display system, or with a large number of picture elements to provide a high resolution display.

According to the present invention a matrix display system of the kind referred to in the opening paragraph is characterised in that the picture elements are arranged in groups of at least two picture elements with the picture elements of each group being addressed via the same switching signal and data signal conductors, the switching elements associated with the picture elements of each group being operable at respective different voltage levels of the switching signal.

By using, therefore, switching signals obtained from the driving means whose levels change in predetermined manner over a selected amplitude range, the switching elements associated with the picture elements of each group can be selectively controlled. A high voltage level switching signal will cause the plurality of switching elements to be turned "on". A subsequent decrease in the voltage level of the switching signal to a value below that required for switching one of the switching elements will result in that one switching element being turned "off", while the one or more other switching elements of the group remain "on". A further decrease in the voltage level of the switching signal to another, lower, selected level will result in one of the other switching elements, assuming there are three or more switching elements associated with each group, being turned "off", and so on. In this way each of the switching elements of a picture element group can be operated selectively. By applying suitable data voltages to the picture element electrodes via the switching elements appropriately in synchronism with the changing switching signal, respective data voltages are supplied to the picture element electrodes of the group, causing each picture element to produce the desired display effect regardless of the display effect produced by other picture elements of the group. The resulting visible display is equivalent to that which would be obtained by a corresponding number of picture elements independently driven via respective conductors and switching elements.

It will be appreciated that by grouping and driving the picture elements in the aforementioned manner, the number of address conductors necessary is reduced.

Each group of picture elements may comprise picture elements located adjacent one another in the same row or located in different, preferably adjacent, rows while still being driven via a single switching signal (row) conductor and a single data signal (column) conductor. The latter arrangement can result in a reduction in the number of switching signal (row) conductors necessary as well as a reduction in the number of data signal (column) conductors.

In the case where, for example, each group comprises three adjacent picture elements of the same row, the number of data signal conductors which need be provided is reduced by a factor of three. Moreover, as the picture elements of each group are associated with only one data signal conductor and one switching signal conductor, and the need for conductors extending between every pair of adjacent elements as in earlier arrangements is avoided, the picture elements can be packed closer together enabling higher densities of picture elements to be achieved. Thus either a higher resolution display or a compact array type display device suitable for use in a projection system can more easily be obtained.

Alternatively, space which becomes available through reducing the number of address conductors could if desired be utilised instead to provide at least some duplicated conductors for redundancy purposes. Thus, for example, each of the reduced number of data signal conductors may have associated therewith a second, duplicate, conductor connected electrically in parallel with, and extending alongside, the conductor. If one of these parallel conductors should prove defective upon testing the display device, it can if necessary be disconnected from the address circuitry using a laser scribing technique leaving the duplicate conductor in circuit.

The number of picture elements provided in the groups may vary. The upper limit is selected bearing in mind that in order to allow each picture element to be charged to a different value through the same data signal conductor, the row energisation period, which is equal to 64 microseconds for a TV display for example, needs to be divided into sub-periods during which different data signals are applied, the number of such sub-periods corresponding to the number of picture elements in the group. The duration of these sub-periods is determined by the operating characteristics of the picture elements with their associated switching elements.

In the case of the display device being intended to produce full colour displays, the number of picture elements in each group is preferably three, and each picture element in a group is arranged to provide a display in a respective one of the primary colours, namely red, green and blue. This offers the advantage that each colour triplet of the display device requires only one data signal conductor, thus greatly simplifying construction of the display device.

The switching elements may, as in known matrix display devices, comprise three terminal transistors, such as thin film transistors (TFTs) carried on a glass substrate or MOS transistors formed on a semiconductor substrate, with their output (drain) terminals being connected to their associated picture element electrodes. In order that the picture elements of each group are selectively controllable in the above described manner, the switching elements associated with the picture elements of each group may have their control terminals (gates) connected directly to a common input, i.e. the same switching signal conductor, and be fabricated so as to exhibit mutually different and defined threshold voltages. In other words, the switching elements of a group require different switching signal voltage levels to turn them "on".

Alternatively, the switching elements of each group may exhibit substantially similar threshold voltages and their control terminals may be connected to a common supply of the switching signals (i.e. a row conductor) via circuit elements, which circuit elements provide the required different operating characteristics. In this respect, the circuit elements may comprise capacitors with mutually different capacitive values, each capacitor being connected in series between the control terminal of a respective switching element and the common supply.

The transistor switching elements associated with each group are preferably interconnected in cascade with the input (source) and output (drain) terminals respectively of adjacent transistors being connected together. The drain terminals of the transistors are also connected to their respective picture element electrodes. While the input (source) terminals of the transistors could instead be connected independently of one another to the data signal conductor, the above arrangement is considered advantageous in that it eliminates the need for separate interconnection tracks between each transistor and its associated data signal conductor and greatly simplifies fabrication.

In order to improve yields by introducing fault-tolerance capability into the display device, each picture element of each group may be associated with a further switching element, the further switching elements of each group being connected to the same data signal conductor as the first-mentioned switching elements and to a different, adjacent, switching signal conductor and, as with the first mentioned switching elements, be operable at respective different voltage levels of the switching signal on this different conductor. This adjacent switching signal conductor would for convenience normally be the next switching signal conductor, this conductor also being connected to the first-mentioned switching elements associated with the picture elements of the succeeding row. Each picture element is therefore associated with two switching elements addressed respectively with switching signals from two successive switching signal conductors. In use, operation of the first mentioned switching elements serves in effect to pre-charge the picture elements concerned using data intended for picture elements of a preceding row and the further switching elements subsequently operate, upon a switching signal being supplied to the succeeding switching signal conductor, to load those picture elements with their proper data. While this drive scheme is more complicated, it offers the advantage of fault tolerance. In the event of, for example, one of the first-mentioned switching elements of a group proving to be faulty, the further switching elements associated with the group operate to ensure a display effect is produced by the picture elements rather than one or more of the picture elements being perhaps permanently on or off as could otherwise happen. In the event, on the other hand, of one of the further switching elements of the group being defective, the first-mentioned switching elements operate to ensure that an acceptable display effect is produced. In the specific example described this display effect would be similar to that obtained from correspondingly-positioned picture elements in the preceding row. In the situation where the first-mentioned switching elements of each group are interconnected in cascade, the further switching elements may likewise be interconnected in cascade.

BRIEF DESCRIPTION OF THE DRAWINGS

Embodiments of matrix display systems in accordance with the present invention will now be described, by way of example, with reference to the accompanying drawings, in which:-

DETAILED DESCRIPTION OF THE INVENTION

Figure 1:
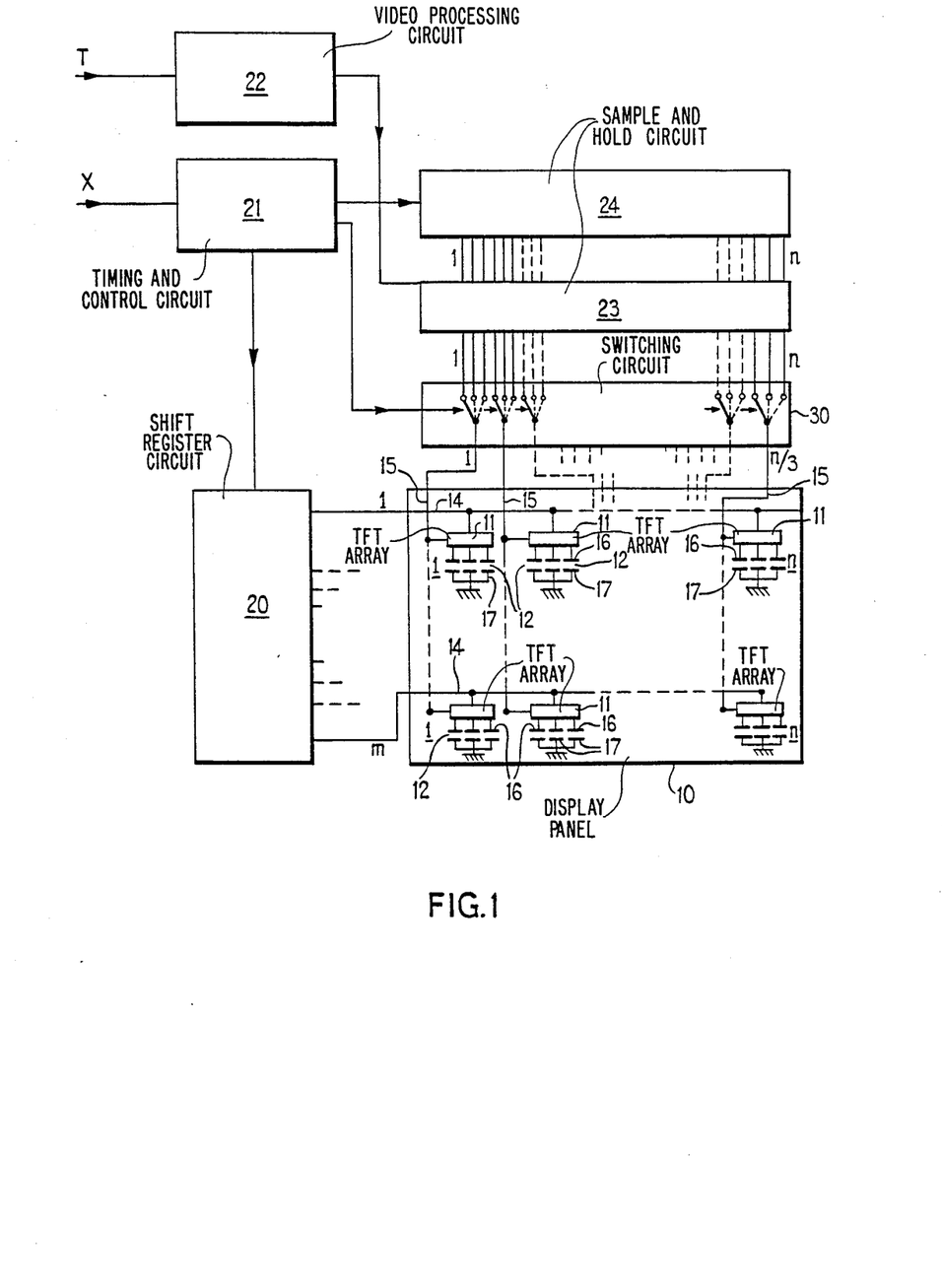
FIG. 1 is a schematic circuit diagram of a matrix display system according to the present invention having a liquid crystal display device with picture elements in a column and row array and intended to be used for displaying video information.

Referring to FIG. 1, there is shown in simplified form a block diagram of the matrix display system which includes an active matrix addressed liquid crystal display panel 10 consisting of m rows (1 to m) with n horizontal, and vertically—aligned, picture elements 12 (1 to n) in each row, only a few of which are indicated in FIG. 1 for simplicity. In practice, the total number of picture elements (m×n) in the column and row matrix array may be 200,000 or more. Each picture element has an associated switching element in the form of an amorphous silicon thin film transistor (TFT). Groups of three of these TFTs associated with groups of three adjacent picture elements in each row are indicated in FIG. 1 by the blocks 11.

The gate electrode of all TFTs associated with picture elements in the same row are connected to a respective row conductor 14 to which switching (gating) voltage signals are applied. The source electrodes of the TFTs are supplied with data signals via column conductors 15. The drain electrodes of the TFTs are each connected to a respective electrode 16 forming part of, and defining the area of, its associated picture element.

The row and column conductors 14 and 15, the TFTs and picture element electrodes 16 are all carried on one substrate of the panel. A common counter electrode, portions of which are indicated at 17 in FIG. 1, associated with all the picture elements is carried on a further substrate extending parallel to, and spaced from, this substrate with TN liquid crystal material disposed therebetween. The opposing substrates, which may be of glass, are provided with polariser and analyser layers in conventional manner. In operation of the panel, the liquid crystal material modulates light depending upon a voltage applied thereacross with each picture element, defined by a respective picture element electrode 16, an opposing portion of the common electrode 17, and the liquid crystal material therebetween, being operable to vary light transmission through the panel in accordance with a drive voltage applied across its respective electrodes. The picture elements 12 in FIG. 1 are represented by capacitors denoting the picture element capacitance. A separate storage capacitor connected in known manner in each picture element circuit could be provided but this is not always necessary.

Row addressing of the matrix array of picture elements 12 is achieved by applying a positive switching signal to a row conductor 14. This turns on the TFTs in that row in a selective manner as will be described. The row conductors 14 are sequentially addressed to provided row scanning. Using one row at a time addressing each TFT is switched on during a line time Tl during which data signals, in this case video information signals, are transferred to the picture elements via the column conductors 15. During the remainder of the field period, Tf, (Tf being approximately equal to m. Tl) the TFT is off and its function is to keep the video voltage across its associated picture element by virtue of the natural capacitance of the picture element. The liquid crystal is effectively directly driven, and thus any number of rows could be addressed, depending on the switching characteristics of the TFT.

The general construction and operation of active matrix address liquid crystal display panels are well known and have been widely described and documented elsewhere. For this reason, it is not considered necessary to describe here these general aspects in detail. For further information in this respect, reference may be made to the paper entitled "Liquid Crystal Matrix Displays" by Lechner et al, published in Proceedings of the IEEE, Vol. 59, No. 11, November 1971, pp 1561-1579.

The row conductors 14 are driven by a digital shift register circuit 20 supplied with regular timing pulses from a timing and control circuit 21. The timing and control circuit 21 in turn is supplied with synchronisation signals, X, derived from received TV signals via a tuner, IF circuit, video amplifier and synchronisation separator circuits (not shown). Video information signals, T, from the video amplifier are applied, via a video processing circuit 22, to a sample and hold circuit 23 controlled by a shift register circuit 24 which is fed with timing signals from the timing and control circuit 21. The shift register and sample and hold circuits 23 and 24, which are of known type as conventionally used and accordingly shown here in simple block form, act as a serial to parallel conversion circuit appropriate to the line at a time addressing of the panel and sample one line of the video information signal at a time and place the relevant voltages on the column conductors 15 via a switching circuit 30 whose function will become apparent. The particular sample and hold circuit 23 employed depends upon whether the display system is to provide a half or full vertical resolution, colour or monochrome, TV display. In all forms, however, the circuit 23 samples the incoming video information signal at n points during each TV line period and applies these voltages respectively to n output lines, where n corresponds to the number of picture elements in each row of the panel 10. The n output lines from the circuit 23 are fed into the switching circuit 30 which comprises a series of solid state switches whose operation is controlled by the timing and control circuit 21. The circuit 30 has n/3 outputs, each of which is coupled to a respective one of the column conductors 15 and is switchably connected in predetermined sequence, via an associated one of the solid state switches, to each one of a group of three adjacent outputs of the circuit 23 in turn.

When the TFTs in one row are turned on, they form conductive paths between the column electrodes 15 and their respective picture element electrodes 16 so that the picture elements in that row charge up to the appropriate video information voltage. When the TFTs are turned off by removal of the switching signal from the row conductor 14, the picture elements are isolated and charge is stored on the elemental capacitors. The picture elements thus stay in the state into which they were driven until the next time they are addressed, which, in the case of a TV display, will be in the subsequent frame period.

In order to avoid electrochemical degradation of the liquid crystal material, the polarity of the drive voltages applied to the picture elements is, in accordance with known practice, inverted periodically, although the means by which this is achieved has been omitted from FIG. 1 for simplicity.

Figure 2:
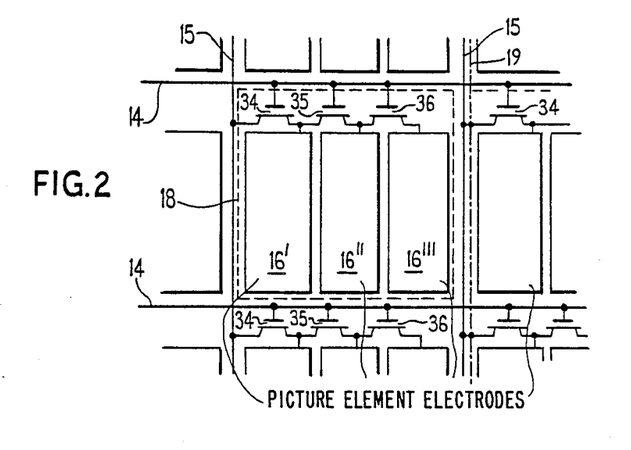
FIG. 2 shows diagrammatically in plan view, and in greater detail, a part of the display device of the system of FIG. 1 in which the picture elements of the device are arranged in groups, the particular part shown comprising a typical group consisting of three juxtaposed picture elements in one row of the device.

Referring now also to FIG. 2, there is shown a typical portion of the display panel 10 in greater detail. In accordance with the invention, the picture elements are arranged in groups, each group, such as that indicated by the dotted line 18, comprising a plurality of juxtaposed picture elements 12 sharing the same column and row conductors 14 and 15. In the illustrated embodiment, each group comprises three picture elements located adjacent one another in the row direction, their electrodes here referenced 16', 16" and 16'''. Although shown as oblong other electrode shapes, such as squares, could be employed. The three TFTs associated with the three picture element electrodes, referenced 34, 35 and 36, and corresponding to a block 11 in FIG. 1, are arranged to one side of the electrodes and have their gate terminals connected directly to the same row conductor 14. Their drain terminals are connected directly with their respective picture element electrodes. The TFTs are interconnected in cascade with the drain terminal of TFT 34 connected to the source terminal of TFT 35 and the drain terminal of TFT 35 connected to the source terminal of TFT 36.

The source terminal of TFT 34 is connected to a column conductor 15. This column conductor 15 is shared by the group of three picture elements (and likewise other similar groups of picture elements in the same columns as these picture elements) whereby only one column conductor 15 is provided extending between adjacent groups of three picture elements compared with one column conductor between every adjacent pair of picture elements in known display panels. Hence, only n/3 column conductors 15 are provided.

The TFTs 34, 35 and 36 are selectively controllable so that video information in the form of voltage signals can be loaded into the three picture elements as appropriate. In this respect, the TFTs of this group (and likewise corresponding TFTs in other groups) are arranged to switch to their "on" states at respectively different, well defined, voltage levels on the row conductor 14. Thus, at a certain voltage level on the conductor 14, the TFT 34, (and correspondingly-positioned TFTs of other groups in the same row), will be switched "on". At a higher voltage level, TFT 35, (and again other correspondingly-positioned TFTs of other groups in the same row), will be switched "on" as well. At an even higher voltage level, the TFT 36, (and other correspondingly-positioned TFTs in the row), will also be switched "on", so that at this voltage level all three TFTs in each group, and thus all TFTs of the row, will be switched on simultaneously.

In the example illustrated in FIG. 2, this selective control of the TFTs is achieved by fabricating the TFTs of each group so as to have a different inherent threshold voltage, although other techniques may be employed instead, as will be described subsequently.

Figure 3A:
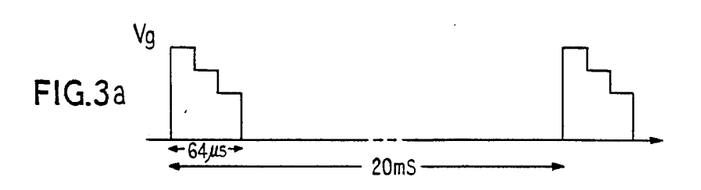
FIGS. 3a and 3b show by way of example typical switching signal and data signal waveforms respectively applied to the group of three picture elements shown in FIG. 2.

FIG. 3a shows part of a typical waveform for the switching signal, Vg, applied to a single row conductor 14. At the beginning of a selected row energisation period, the switching signal Vg is at a high level. At a certain time thereafter the signal Vg drops to an intermediate voltage level and then, after another predetermined period, to a low level before finally dropping to zero at which time a similar waveform is applied to the next row conductor 14 to be energised. The duration of this sequence of high, intermediate and low voltage levels corresponds approximately with the duration of row energisation, which for a TV display will be equal to the line period, that is, around 64 microseconds, and each level is maintained for a similar period, approximately one third of the line period. During the next TV field period, this sequence is repeated, and so on. The time interval between these sequences for a TV display is around 20 ms.

Figure 3B:
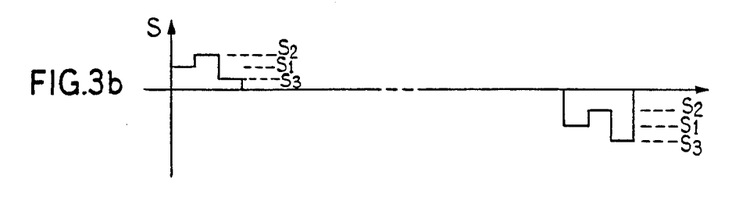

In synchronism with these switching signal sequences, and similarly under the control of the timing and control circuit 21, video information (data signals), S, for the three picture elements of the group are applied to the relevant column conductor 15. Similarly video information signals for the three picture elements of all other groups in the same row are applied to their respective column conductors 15. FIG. 3b illustrates a typical example of video information waveform for the group of three elements shown in FIG. 2 where the voltages to be supplied to the picture element electrodes 16', 16" and 16'" are designated $S_3$, $S_2$ and $S_1$ respectively. The polarity of the data voltages is inverted for row energisations in successive fields. During the period between the two successive sets of information signals shown in FIG. 3b, similar information signals will be applied to the same column conductor 15 for other groups of picture elements of the panel in the same columns, but these have been omitted for simplicity.

Loading the group of three picture elements shown in FIG. 2 will now be described in greater detail. At the beginning of the switching signal, Vg, sequence, all three TFTs are turned on as this high voltage level exceeds all their threshold voltages. Simultaneously with this high voltage level, the information signal S1 is applied to the associated column conductor 15 by the circuits 23, 24 and 30 and is transferred to the drain electrodes of the three TFTs so that all three picture element electrodes 16', 16" and 16'" are charged to S1. When the switching signal voltage drops to its intermediate level, the TFT 36 turns off as this intermediate level is below its threshold voltage but the other two TFTs 34 and 35 remain on. Simultaneously with this intermediate switching signal level, the information signal applied to column conductor 15 is changed to S2 by switching of the circuit 30 so that the picture element electrodes 16' and 16" are then charged to S2. The charge on electrode 16'" remains at S1. Upon the switching signal voltage dropping further to its low level, the TFT 35 is turned off as this low level is below its threshold voltage so that only TFT 34 remains on. The video information signal on column 15 again changes at this point to S3 by operation of the circuit 30 so that picture element electrode 16' is charged to S3. Electrodes 16" and 16'" remain at S2 and S1 respectively. Finally, when the switching signal voltage is removed, TFT 34 turns off, thus storing charge S3 on electrode 16'.

The picture element electrodes 16', 16" and 16'" then remain at their respective charged levels until the next time the row is energised with a further switching signal sequence in the subsequent field period and fresh information signals are then applied to the electrodes in a similar manner.

Although during this loading procedure some of the picture elements are supplied temporarily with video information not specifically intended for those elements, the duration of the periods involved is so small that a visible effect in the display picture should not be perceived.

It will be appreciated that the picture elements of other groups in the same row are loaded with the proper video information during the row energisation period in a similar manner via their associated, different, column conductors 15. The remaining rows of picture elements are loaded sequentially in similar fashion.

Using the above-described technique, the picture elements are loaded with their appropriate video information using only one third of the number of column conductors employed previously. This allows a higher packing density of picture elements enabling increased picture element areas or more compact display panels suitable for use in projection systems and also reducing the risk of problems occurring because of column conductor faults.

Some of the space which becomes available through the reduction in numbers of column conductors necessary may be utilised to provide duplicate column conductors each of which runs alongside a respective column conductor 15 and is connected electrically in parallel therewith. This duplicate conductor provides a back up in the event of the column conductor 15 proving defective. The defective conductor, or a portion thereof, may be disconnected from the circuit by a laser scribing technique if such action is necessary, for example if the fault involves a short circuit between the conductor and a row conductor. An example of one such duplicate conductor is shown chain dotted at 19 in FIG. 2.

Whereas in the particular embodiment described above each group of picture elements consists of three elements, the numbers of elements in the groups may be varied. For example each group may comprise two or four or more elements. Obviously the numbers of elements in the groups is limited in view of the preset duration of the available loading time, corresponding to a TV line period, and by the switching characteristics of the TFTs and the charging characteristics of the picture elements.

Groups of three picture elements are particularly advantageous in a full colour display system. In this case, a filter sheet comprising red, green and blue filter elements overlies the picture element electrodes 16', 16" and 16'" , with the corresponding elements of other groups, being in registration with a respective colour filter element. For example, the three picture elements defined by the electrodes 16', 16" and 16'" may respectively display red, green and blue video information. Each group thus forms a colour triplet having a red, green and blue picture element and similar in respects to those of a colour CRT's phosphor screen. Conveniently therefore, using the described loading procedure, each colour triplet of the display panel is loaded using only one row and one column conductor. Obviously in such a full colour display system the sample and hold circuit 23 is modified and fed with appropriate R, G and B video signal components from the processing circuit 22 in a known manner for supply in the relevant order to its n output lines in accordance with the chosen order of colours in the triplets.

The area occupied by each of the groups of three picture element electrodes, and hence the area of the picture elements they serve to define, may correspond substantially with the area of a single picture element in a conventional liquid crystal matrix display system thereby increasing the horizontal resolution of both monochrome and full colour types of display, by a factor of three in the described example. Even when the area of each picture element corresponds with that of a conventional display system, the system of the invention still offers a reduction in the numbers of column conductors necessary and the attendant advantages.

Figure 4:
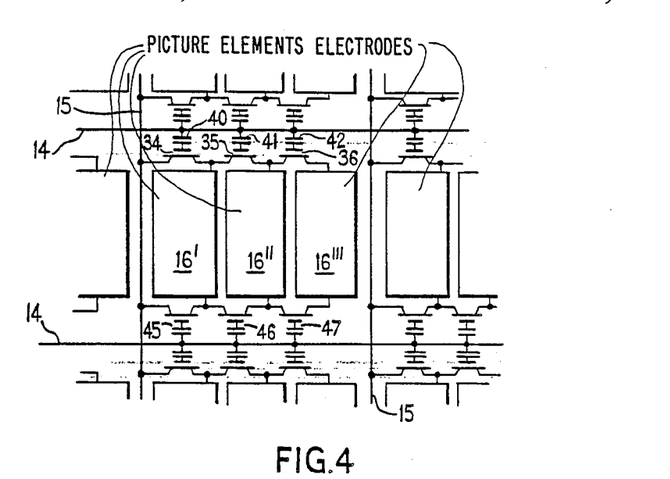
FIG. 4 is a view similar to that of FIG. 2 showing a typical group of three picture elements of a modified form of the display device of FIG. 2 and which also incorporates further components for fault tolerance purposes.

FIG. 4 is a schematic plan view, similar in respects to FIG. 2 showing a typical part of a modified display device of a liquid crystal matrix display system acording to the invention. The display device shares many similarities with that of FIG. 2 and accordingly like components have been designated the same reference numerals. This display device differs firstly in that the TFTs 34, 35 and 36 are fabricated identically so as to have a substantially similar threshold voltages and are each rendered switchable in response to a different switching voltage level appearing on the row conductors 14 by means of capacitors, here referenced 40, 41 and 42, connected in series between their gate terminals and the row conductor 14. The capacitors 40, 41 and 42 are of suitably different values whereby three different and well defined voltage levels on the conductor 14 are needed to turn on the respective three TFTs. In use, the display device operates similarly to the previously-described device with the TFTs together with their associated capacitors serving in effect as TFTs with different threshold levels.

The modified display device differs secondly in that further switching elements which in this embodiment comprise a further set of cascade-connected TFTs and associated capacitors are also provided for each group, this further set, referenced 45, 46 and 47 in FIG. 4, being arranged on the opposite side of the picture element electrodes 16', 16" and 16''' and interconnected as shown between the same column electrode 15 and the picture element electrodes in a similar manner to the TFTs 34, 35 and 36. The sides of the capacitors of this further TFT set remote from their respective gate terminals are coupled to the row conductor 14 immediately succeeding that associated with the first-mentioned TFTs, 34, 35 and 36. The provision of this further set of TFTs offers a degree of fault tolerance in that certain of the more common defects experienced with TFTs will not result in the associated picture element being permanently on or off. The picture elements of the groups are effectively addressed twice in each field period, first through the TFTs 34, 35 and 36 upon energisation of their associated row conductor 14 and then through the TFTs 45, 46 and 47 upon energisation of the succeeding row conductor 14. Addressing through the TFTs 34, 35 and 36 serves to pre-charge the picture elements of the group, using video information signals intended primarily for picture elements of the preceding row, prior to them being loaded with their proper video information via TFTs 45, 46 and 47. If one of the TFTs 34, 35 and 36 should prove defective, information can nevertheless be loaded into the group of picture elements through the further TFTs 45, 46 and 47. If, on the other hand, one of these further TFTs proves defective, the picture elements can still produce an acceptable display effect, rather than possibly being permanently on or off as might otherwise happen, using the video information supplied through TFTs 34, 35 and 36. Although this information will be the same as displayed by the correspondingly-positioned picture elements in the previous row, this would not normally be perceived by a viewer.

In the above-described embodiment, and modifications thereof, the picture elements of the display device are arranged in groups comprising picture elements of the same row leading to a reduction in the numbers of data signal conductors. However it will be appreciated that other group configurations are possible involving picture elements of different rows leading to a reduction in the number of switching signal conductors necessary as well as, or instead of, reductions in data signal conductors.

Figure 5:
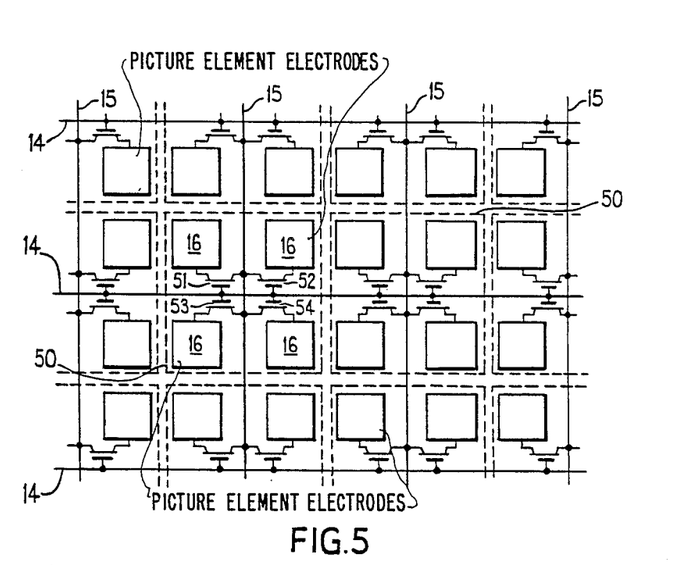
FIG. 5 shows diagrammatically in plan view a typical part of the display device of another embodiment of matrix display system according to the invention, the display device in this case having its picture elements arranged in groups of four from two adjacent rows.

Referring to FIG. 5, there is shown in plan diagrammatic form a part of the active matrix addressed liquid crystal display device of another embodiment of a display system according to the invention in which reductions in row conductors are achieved as well. The display device shares many similarities with that of the FIGS. 1 and 2 embodiment and accordingly the same reference numerals have been used to designate like components. The main differences between this display device and that of FIG. 2 are that, firstly, the picture elements are configured in groups of four rather than three, and, secondly, each group comprises picture elements, in this case pairs of elements, from two adjacent rows of picture elements. Two complete examples of such groups are shown bordered by the dotted lines 50. The picture element electrodes 16 of the four picture elements of a typical group are connected to the drain terminals of four TFTs 51, 52, 53 and 54, respectively. The gate terminals of these four TFTs are connected directly to the same row conductor 14. Likewise, their source terminals are connected to the same column conductor 15. The four TFTs associated with each group have mutually different and defined threshold voltages, similar to the TFTs of the FIG. 2 arrangement, although instead they could have substantially identical threshold voltages and be coupled to the row conductor 14 via respective series capacitors having different capacitance values in a similar manner to the arrangement of FIG. 4.

Operation of this display device is generally similar to that previously described with reference to the embodiment of FIGS. 1 and 2. A switching signal Vg similar to that shown in FIG. 3a except that in this case four rather than three different steps of predetermined voltage levels chosen in accordance with the threshold voltage levels of the four TFTs of each group are provided in each switching sequence, is applied to each row conductor 14 in turn. Appropriate data signals are applied to the column conductors 15 in synchronism with the stepping of the switching signal sequence as previously so that at the end of the switching signal sequence each of the four picture elements of each of the groups in a line is loaded with the relevant video information. It will be seen therefore that two rows of picture elements are loaded in one row energisation period. Successive pairs of rows of picture elements are subsequently loaded in similar fashion in turn to build up a complete display picture in one field period.

In view of the different configuration of the picture elements in each group compared with that described with regard to FIG. 2, appropriate modification will be necessary to the circuits 20, 23, 24 and 30 of FIG. 1 for driving the display device. In particular, as two rows of picture elements of the device are effectively driven simultaneously, that is, at least in the same row energisation period, the sample and hold circuit 23 is capable in this case of sampling and holding data signals for two TV lines at a time and the switching circuit 30 is suitably configured with regard to the outputs from circuit 23 for supplying the relevant data signals to the column conductors 15 in an order appropriately corresponding to the chosen loading sequence of the four elements of each group. For a given number of picture elements it will be appreciated that with this form of display device, the number of column conductors 15 necessary is half that required by a conventional display device with the same number of picture elements. Moreover, it will be seen that the number of row conductors 14 is also halved compared with a conventional display device and it will be understood therefore that the shift register circuit 20 is arranged to energise sequentially only the reduced number of row conductors 14. Each row conductor 14 may be energised by this circuit 20 with a switching synch sequence for a period corresponding to twice that of a TV line period.

As the picture elements of each group are taken from two adjacent rows in this embodiment, it is convenient for the row conductors 14 to extend, as shown, through the groups rather than along spaces between the groups as in the previous embodiment. Likewise, the column conductors 15 extend through the groups.

While groups of four picture elements have been specifically described for this embodiment, each group may have more, or less, than four picture elements. If, for example, each group comprises six picture elements, using three from each of two adjacent rows, then each group may be used, in conjunction with the appropriate colour filters, to provide in effect two colour triplets in a full colour display.

As before, duplicate address conductors may be provided if desired.

I claim:

1. A matrix display system comprising an active matrix display device having an array of picture elements arranged in rows and columns and defined by opposing electrodes with an electro-optical display medium disposed therebetween, switching elements associated with the picture elements and selectively operable by switching signals to apply data signals to the picture element electrodes, and switching signal and data signal conductors for supplying switching signals and data signals respectively to each switching element, characterised in that the picture elements are arranged in groups of at least two picture elements with the picture elements of each group being addressed via the same switching signal and data signal conductors, the switching elements associated with the picture elements of each group being operable at respective different voltage levels of the switching signal.

2. A matrix display system according to claim 1, wherein each group of picture elements comprises picture elements located adjacent one another in the same row.

3. A matrix display system according to claim 1, wherein the switching signal and data signal conductors extend at right angles to each other along spaces between adjacent groups of picture elements.

4. A matrix display system according to claim 3, wherein at least some of the data signal and switching signal conductors are duplicated.

5. A matrix display system according to claim 1, wherein each group of picture elements comprises picture elements located in adjacent rows.

6. A matrix display system according to claim 5, wherein the switching signal conductors and data signal conductors extend at right angles to each other through groups of picture elements.

7. A matrix display system according to claim 1, wherein each group of picture elements comprises three picture elements and in that each of the three picture elements is arranged to provide a display in a respective one of the primary colours.

8. A matrix display system according to claim 1, wherein the switching signals comprise a voltage waveform which changes from higher level at which all the switching elements for the picture elements of a group are operated to at least one lower level at which at least one switching element is not operated so as to operate selectively the switching elements, and in that the data signals for the picture elements concerned are supplied in synchronism with changes in the switching signal voltage waveform.

9. A matrix display system according to claim 1, wherein the picture element of each group are each associated with a respective further switching element, the further switching elements of each group being connected to the same data signal conductor as the first-mentioned switching elements and to a different, adjacent, switching signal conductor, and being operable at respective different voltage levels of the switching signal supplied to that different switching signal conductor.

10. A matrix display system according to claim 1, wherein the switching elements comprise transistors whose output terminals are connected to their associated picture element electrodes.

11. A matrix display system according to claim 10, wherein the control terminals of the transistors of each group are connected directly to their associated switching signal conductor and in that the plurality of transistors for the picture elements of each group are fabricated so as to exhibit mutually different and defined threshold voltages.

12. A matrix display system according to claim 10, wherein the transistors associated with each group of picture elements exhibit substantially similar threshold voltages and in that their control terminals are connected to an associated switching signal conductor via circuit elements, which circuit elements provide the required different switching voltage level operating characteristics.

13. A matrix display system according to claim 12, wherein the control terminals of the transistors associated with a group of picture elements are each connected to an associated switching signal conductor via a respective series capacitor and in that the series capacitors associated with the group are of mutually different values.

14. A matrix display system according to claim 10, wherein the transistors associated with each group of picture elements are interconnected electrically in cascade with the input and output terminals respectively of adjacent transistors being connected together, each output terminal also being connected to a respective one picture element electrode.

15. A matrix display system according to claim 10, wherein the transistors comprise thin film transistors.

16. A matrix display system according to claim 1, wherein the electro-optical display medium comprises liquid crystal material.

17. A matrix display system according to claim 2, wherein the switching signal and data signal conductors extend at right angles to each oth(R)r along spaces between adjacent groups of picture elements.

18. A matrix display system according to claim 17, wherein at least some of the data signal and switching signal conductors are duplicated.

19. A matrix display system according to claim 6, wherein each group of picture elements comprises three picture elements and in that each of the three picture elements is arranged to provide a display in a respective one of the primary colours.

20. A matrix display system according to claim 7, wherein the switching signals comprise a voltage waveform which changes from a higher level at which all the switching elements for the picture elements of a group are operated to at least one lower level at which at least one switching element is not operated so as to operate selectively the switching elements, and in that the data signals for the picture elements concerned are supplied in synchronism with changes in the switching signal voltage waveform.

21. A matrix display system according to claim 8, wherein the picture elements of each group are each associated with respective further switching elements, the further switching elements of each group being connected to the same data signal conductor as the first-mentioned switching elements and to a different, adjacent, switching signal conductor, and being operable at respective different voltage levels of the switching signal supplied to that different switching signal conductor.

22. A matrix display system according to claim 9, wherein the switching elements comprise transistors whose output terminals are connected to their associated picture element electrodes.

23. A matrix display system according to claim 13, wherein the transistors associated with each group of picture elements are interconnected electrically in cascade with the input and output terminals respectively of adjacent transistors being connected together, each output terminal also being connected to a respective one picture element electrode.

24. A matrix display system according to claim 14, wherein the transistors comprise thin film transistors.

25. A matrix display system according to claim 15, wherein the electro-optical display medium comprises liquid crystal material.

* * * * *